(12) United States Patent
Husain et al.

(10) Patent No.: US 9,578,053 B2
(45) Date of Patent: Feb. 21, 2017

(54) SYSTEMS AND METHODS FOR USING COGNITIVE FINGERPRINTS

(71) Applicant: SparkCognition, Inc., Austin, TX (US)

(72) Inventors: Syed Mohammad Amir Husain, Round Rock, TX (US); Martin Andreas Abel, Austin, TX (US)

(73) Assignee: SparkCognition, Inc., Austin, TX (US)

( * ) Notice: Subject to any disclaimer, the term of this patent is extended or adjusted under 35 U.S.C. 154(b) by 0 days.

(21) Appl. No.: 14/683,735

(22) Filed: Apr. 10, 2015

(65) Prior Publication Data

US 2015/0295926 A1    Oct. 15, 2015

Related U.S. Application Data

(60) Provisional application No. 61/977,933, filed on Apr. 10, 2014.

(51) Int. Cl.
*G06F 7/04* (2006.01)
*H04L 29/06* (2006.01)

(52) U.S. Cl.
CPC ......... *H04L 63/145* (2013.01); *H04L 63/1441* (2013.01)

(58) Field of Classification Search
CPC ............. H04L 63/0861; H04L 63/1441; H04L 63/145; H04L 63/20
USPC ............................................. 726/6; 713/156
See application file for complete search history.

(56) References Cited

U.S. PATENT DOCUMENTS

| | | | |
|---|---|---|---|
| 5,452,442 A | 9/1995 | Kephart | |
| 6,088,658 A | 7/2000 | Yazici | |
| 7,813,822 B1 * | 10/2010 | Hoffberg | G06K 9/00369 381/73.1 |
| 8,135,657 B2 * | 3/2012 | Kapoor | G06F 9/505 706/45 |
| 8,316,237 B1 * | 11/2012 | Felsher | H04L 9/0825 380/282 |
| 8,484,152 B2 * | 7/2013 | Hoglund | G06F 21/562 706/52 |
| 8,584,235 B2 * | 11/2013 | Topan | G06F 21/563 713/179 |
| 9,021,589 B2 * | 4/2015 | Anderson | G06F 21/56 709/206 |
| 9,245,120 B2 * | 1/2016 | Friedrichs | G06F 21/56 |
| 9,294,501 B2 * | 3/2016 | Mesdaq | H04L 63/145 |

(Continued)

*Primary Examiner* — Samson Lemma
(74) *Attorney, Agent, or Firm* — Greenberg Traurig, LLP; Chinh H. Pham; Robert L. Hover

(57) ABSTRACT

A system and method for creating a core cognitive fingerprint. A core cognitive fingerprint can be used to capture the evolution of a system state and potentially respond with a predetermined action if the fingerprint falls within a threshold. The method includes: identifying a set of time frames within which data is extracted; providing a plurality of pattern recognizers; processing the extracted data through the plurality of pattern recognizers to generate an initial set of elements; extracting identified relationships amongst the initial set of elements; modifying the initial set of elements to include the identified relationships to create an intermediate set of elements; comparing the intermediate set of elements against assigned values to weigh each element in the intermediate set of elements to create a final set of elements; and using the final set of elements as a cognitive fingerprint.

14 Claims, 8 Drawing Sheets

(56) References Cited

U.S. PATENT DOCUMENTS

| | | | |
|---|---|---|---|
| 2009/0287837 A1* | 11/2009 | Felsher | G06F 19/322 |
| | | | 709/229 |
| 2010/0235285 A1* | 9/2010 | Hoffberg | G06Q 20/401 |
| | | | 705/75 |
| 2010/0317420 A1* | 12/2010 | Hoffberg | G06Q 30/0207 |
| | | | 463/1 |
| 2012/0294511 A1* | 11/2012 | Datta | G06K 9/00771 |
| | | | 382/155 |
| 2013/0111591 A1 | 5/2013 | Topan | |
| 2013/0159021 A1* | 6/2013 | Felsher | G06F 19/322 |
| | | | 705/3 |
| 2013/0326625 A1 | 12/2013 | Anderson | |
| 2014/0081699 A1* | 3/2014 | Bammi | G06F 21/36 |
| | | | 705/7.28 |
| 2014/0165203 A1 | 6/2014 | Friedrichs | |
| 2015/0067346 A1* | 3/2015 | Ross | G06K 9/3216 |
| | | | 713/176 |
| 2015/0096023 A1 | 4/2015 | Mesdaq | |
| 2015/0363586 A1* | 12/2015 | Klevan | G06F 21/32 |
| | | | 726/19 |

\* cited by examiner

SYSTEMS AND METHODS FOR USING COGNITIVE FINGERPRINTS

RELATED APPLICATIONS

This application claims the benefit of and priority to U.S. provisional application No. 61/977,933, filed Apr. 10, 2014, which is hereby incorporated herein by reference in its entirety.

BACKGROUND OF THE INVENTION

Field of the Invention

The present invention relates to systems and methods for using cognitive fingerprints. More particularly, the present invention relates to an apparatus and method for creating a core cognitive fingerprint representing a system state and various embodiments for the use of such cognitive fingerprints.

Description of the Related Art

In the security field, most anti-virus (AV) products rely on pre-computed signatures to identify viruses and threats. However, there is not always enough time for a threat to be found and analyzed, a signature engineered, and an update delivered to users before they are targeted.

Similarly, methods are needed to prevent data theft by unauthorized users. For example, if login credentials for an individual user fall into unauthorized hands, the party possessing these credentials may be able to log into a system or network for which these credentials provide access, and over time, remove proprietary or confidential information from a secure environment. Thus, there exists a need to detect the scenario where legitimate login credentials are being utilized by unauthorized persons, particularly when the theft of data is "subtle" and occurs over a period of time. Multi-factor authentication schemes such as retina and fingerprint scans can address the issue of validating identity, however they can be defeated or circumvented such as when an authorized user indulges in unauthorized removal or theft of information. Additionally, it can be cost-prohibitive to put such defenses in a typical business network at all entry points, such as desktop computers, mobile endpoints and Thin clients.

Methods are needed to detect when legitimate users with authorized credentials are still engaging in unauthorized behavior. Recently, there have been a number of high-profile incidents where an authorized user engages in behavior beyond the scope of their authorization and subsequently steals and releases confidential information. While access control limitations (such as attaching permissions to data) exist, these protections do not protect widespread data theft when a user has legitimate access to the data. Thus, there exists a need to detect atypical behavior by a user on a network to prevent such security breaches.

The use of neural network based recognition systems is common within many industries. These systems typically process inputs as sequences of bits which are connected to a number of cells. These approaches are theoretically content agnostic in that they do not have to account differently for text, images or other forms of input. But in practice, this generality can impose penalties in the form of slower learning processes, and the necessity of creating "deep" structures in order to capture enough pattern information that would allow the system to deliver meaningful results and subsequent recognition.

Other learning approaches are highly tuned to the type of content being processed. For example, some Inductive Logic Programming (ILP) methods process higher-level concepts such as "facts" and "truths" and encode their implications to create reasoning chains. These approaches typically require developing evaluators for context-specific attributes. In many instances, approaches like ILP lack flexibility because they require a lot of domain specific information, customization, and they may not scale to handle variations of problems from adjacent domains.

SUMMARY OF THE INVENTION

Aspects of the present invention address at least the above-mentioned problems and/or disadvantages and provide at least the advantages described below. Accordingly, an aspect of the present invention is to analyze data over a specified period of time to create a cognitive fingerprint representing the analyzed data, and take a corrective action if the cognitive fingerprint predicts a predetermined situation. Another aspect of the present invention is to provide a method and system for creating a core cognitive fingerprint that can be used to capture and summarize the evolution of a system state. In contrast to an approach that would capture a single system state, core cognitive fingerprints can represent the temporal evolution of a system over time. If the core fingerprint is within the threshold of a target goal (where a goal is defined as a state in which malware was detected or unauthorized data theft was detected) an action is taken. Another embodiment is creating a core cognitive fingerprint from biometric measurements to predict health issues.

In accordance with another aspect of the present invention, a method for creating a core cognitive fingerprint is provided. The method includes: identifying a set of time frames, each time frame corresponding to a respective data source, within which data is extracted; providing a plurality of pattern recognizers each having an assigned heuristic specific to a type of content; processing, by the computer system, a combined stream of extracted data through the plurality of pattern recognizers to generate an initial set of elements, each element corresponding to the output of the heuristic assigned to each pattern recognizer; extracting identified relationships amongst the initial set of elements; modifying the initial set of elements to include the identified relationships to create an intermediate set of elements; comparing, by the computer system, the intermediate set of elements against assigned values to emphasize or deemphasize each element in the intermediate set of elements to create a final set of elements; and using the final set of elements as a cognitive fingerprint representing a signature of the data extracted from the time frame, so that the signature can be compared to other cognitive fingerprints for further analysis.

In accordance with another aspect of the present invention, a computer system for creating a core cognitive fingerprint is provided. The computer system includes at least a processor; and memory coupled to the processor and storing instructions that, when executed by the processor, cause the computer system to: identify a set of time frames, each time frame corresponding to a respective data source, within which data is extracted; provide a plurality of pattern recognizers each having an assigned heuristic specific to a type of content; process a combined stream of extracted data through the plurality of pattern recognizers to generate an initial set of elements, each element corresponding to the output of the heuristic assigned to each pattern recognizer; extract identified relationships amongst the initial set of elements; modify the initial set of elements to include the identified relationships to create an intermediate set of elements; compare the intermediate set of elements against assigned values to emphasize or deemphasize each element in the intermediate set of elements to create a final set of elements; and use the final set of elements as a cognitive fingerprint representing a signature of the data extracted from the time frame, so that the signature can be compared to other cognitive fingerprints for further analysis.

In accordance with another aspect of the present invention, the fingerprinting platform can be used for detecting malware, data theft, phishing, and a byzantine website attack.

In accordance with another aspect of the present invention, a cognitive fingerprint can be used as "Temporal Security Signature" of an individual based on their past usage of a certain type of system for a particular purpose In accordance with another aspect of the present invention, a cognitive fingerprinting platform is used for engaging with people through social media and other online services.

In accordance with another aspect of the present invention, a method to forecast time series is provided.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF EXEMPLARY EMBODIMENTS

The following description is provided to assist in a comprehensive understanding of exemplary embodiments of the invention as defined by the claims and their equivalents. It includes various specific details to assist in that understanding; however these specific details are to be regarded as merely exemplary. Accordingly, those of ordinary skill in the art will recognize that various changes and modifications of the embodiments described herein can be made without departing from the scope and spirit of the invention.

Figure 1:
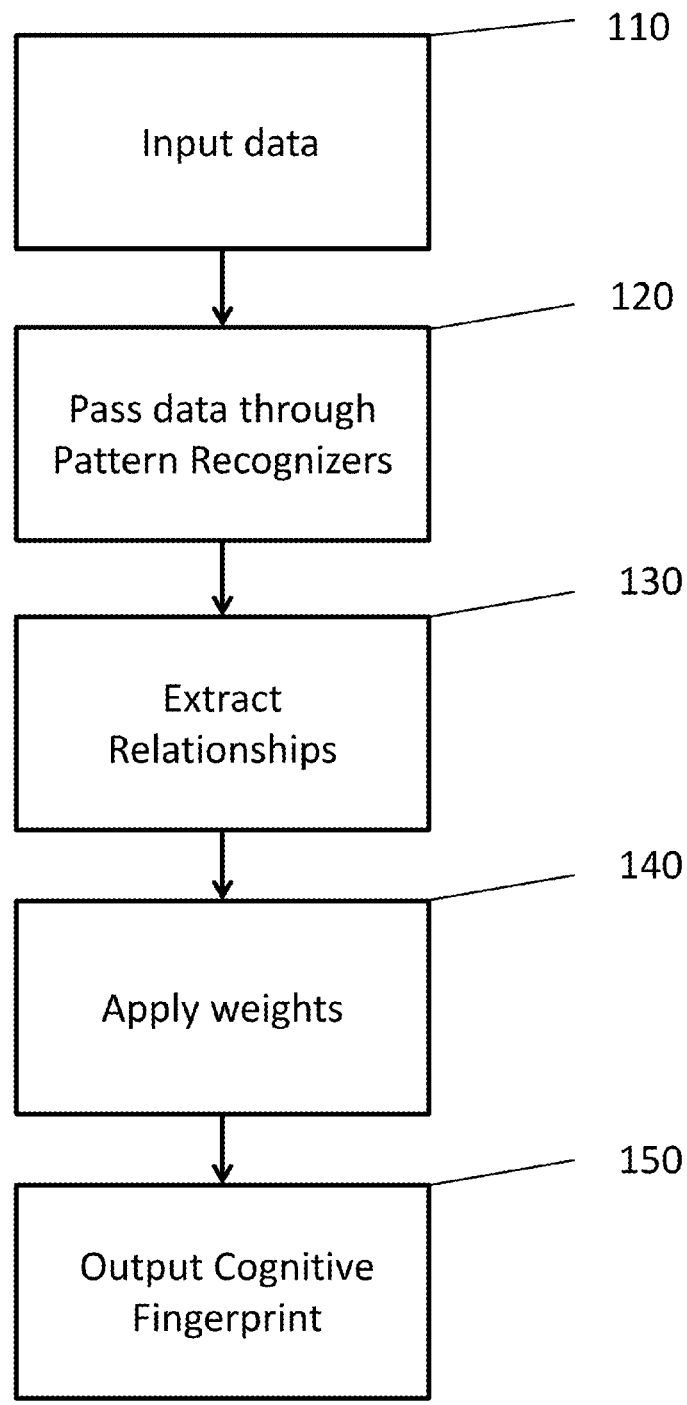
FIG. 1 is a high level block diagram of a core cognitive fingerprinting process according to an exemplary embodiment of the present invention.

FIG. 1 is a high level block diagram of a cognitive fingerprinting process according to an exemplary embodiment of the present invention. Referring now to FIG. 1, in a typical cognitive fingerprinting process, data is inputted at step 110. Data can be inputted from a user computer system, a wireless phone, a network server, and can arrive or be extracted from multiple data sources, implementing multiple formats, etc. Next, pattern recognizers in a computer system look for trends, features, and predictabilities in this data at step 120. Relationships are extracted by the computer system via relationship tests at step 130. Learned weights are applied by the computer system to the extracted relationships at step 140. Finally, a cognitive fingerprint that captures a representation of a system state is generated by the computer system at step 150.

Figure 2:
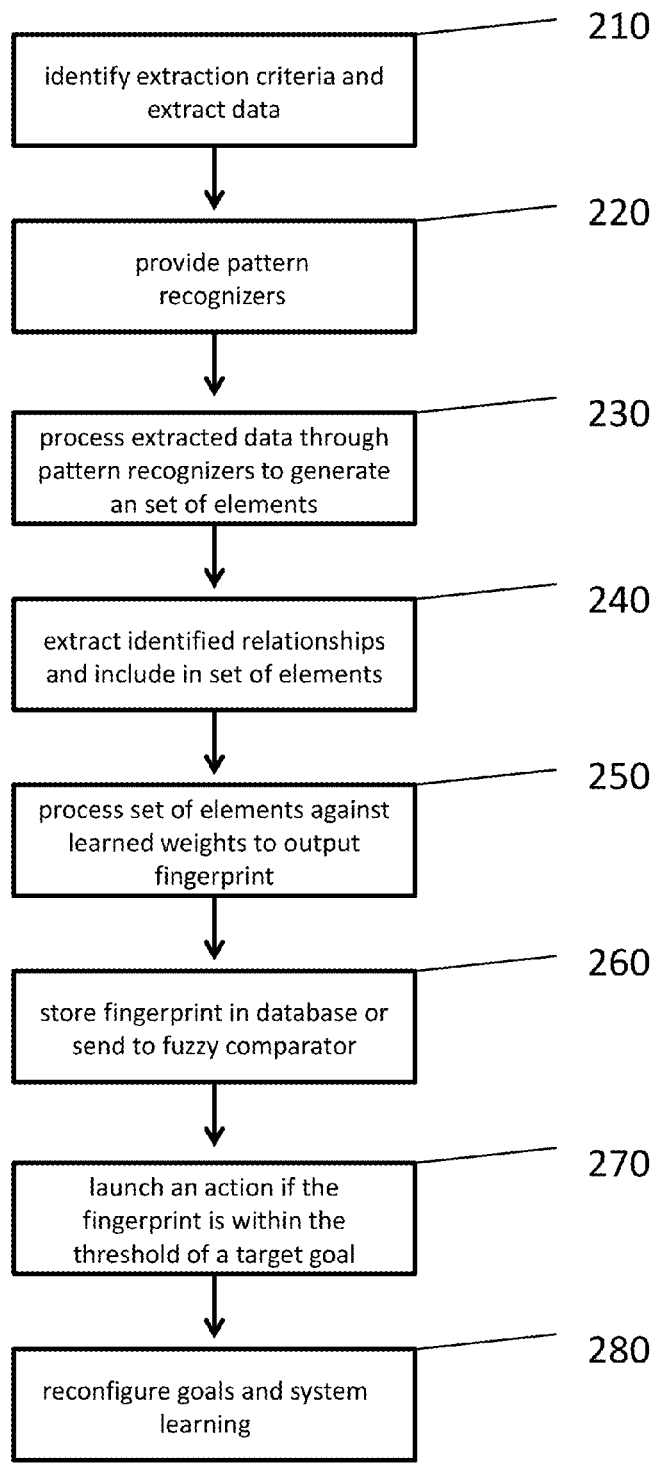
FIG. 2 is a more detailed diagram of a cognitive fingerprinting process according to an exemplary embodiment of the present invention.

FIG. 2 is a more detailed diagram of a cognitive fingerprinting process according to an exemplary embodiment of the present invention.

In step 210, a user can specify extraction criteria such as sources from which data will be extracted. The processor extracts data according to the extraction criteria. Exemplary sources can be system logs, processes, and databases. Data sources can be specified from a user computer system, a wireless phone, a network server, and can include specific files such as CSV files, database tables, polled information from WMI (Windows Management Instrumentation), APIs (Application Programming Interface) or information gathered from Web Services and Web sites. Extraction criteria can also include, for each individual data source, specifying a window of time from which the data will be extracted. For example, a sliding window can be specified to only include data from the previous 4 hours of a system log, whereas a different or similar time frame might be applied to a second data source, e.g. a Twitter feed. Extraction criteria can also including settings for throttling, controlling, and caching the data received from the sources to control the execution speed or resource usage when extracting data.

Figure 3:
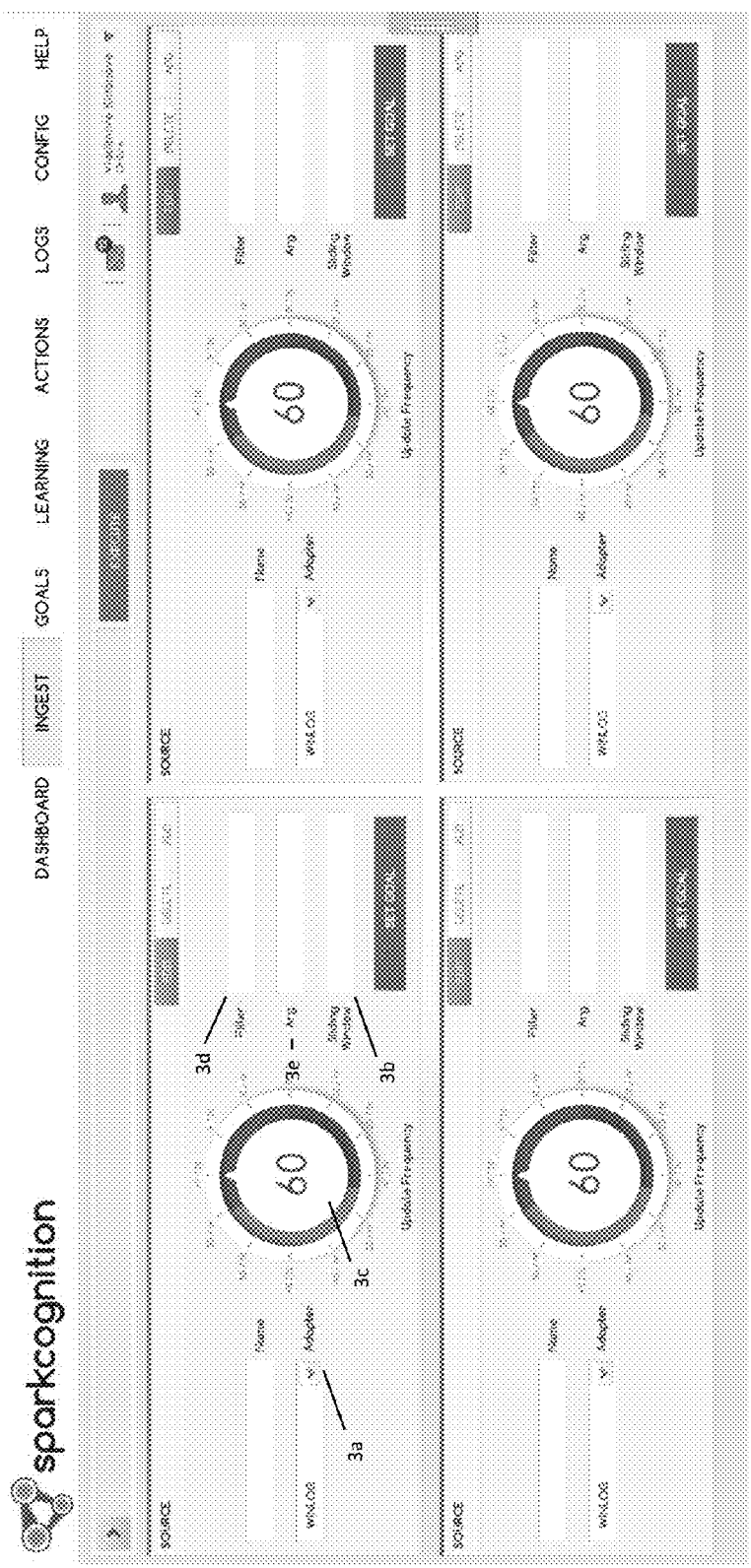
FIG. 3 is an ingestion screen of a cognitive fingerprint process according to an exemplary embodiment of the present invention.

For example, FIG. 3 displays an exemplary ingestion screen capable of providing the extracted data according to an embodiment of the present invention. A user can set up sources of data by selecting an adapter 3*a* for each source and provide a sliding window 3*b*, update frequency 3*c*, filter 3*d* and arguments 3*e*.

In step 220, pattern recognizers are provided. The purpose of a pattern recognizer (PR) is to generate a value indicating the strength of the presence of one or more qualities in, or attributes of, the data. In one exemplary embodiment, a pattern recognizer may be implemented via software operating on a computer system. The pattern recognizer may be configured to implement a heuristic function. A heuristic function is able to process a stream input and respond with a strength of match measure. The output of heuristic functions can be normalized in order to compare multiple heuristics. For example, heuristics can be specified to output a real number between 0 and 1. Heuristics can also be specified to content type, for example text, images, signal or video. Specifying the content type of a heuristic allows a pattern recognizer to be content type specific while the overall fingerprinting process remains content agnostic.

For example, a pattern recognizer could implement a heuristic that only processes text and provides a ratio of numbers to characters in a string of text. In this example, the heuristic would provide an output of 1 if the text was 010101001011 as all of the characters are numbers.

In step 230, the extracted data from step 210 is passed through the pattern recognizers to generate a set of elements, the length of the set equivalent to the number of pattern recognizers. Thus, if we have 10 pattern recognizers, a set of 10 elements will be created. The set of elements can be described as a vector. For example, if we have n pattern recognizers (PR) each one can be described ($PR_i$) where i, $\{1 \leq i \leq n\}$ Given an input C, $PR_i(C) = a_i$ where $a_i$ is a vector comprised of n elements.

$PR_1(C) = a_1$ $PR_2(C) = a_2$ $PR_n(C) = a_n$ and $\{0 \leq a_i \leq 1\}$.

Thus, given an input C, PR(C)=A where A is a vector $\{a_i\}$ and i, $\{1 \leq i \leq n\}$. A denotes a "set of elements" for input C.

In one embodiment, the method does not limit nor require every pattern recognizer to provide a meaningful output. For example, if a stream comprised of image data is run across a text focused heuristic pattern recognizer, the output may simply be 0. Pattern recognizers may be configured to determine if the provided input is supported by a given pattern recognizer. If a mismatch is identified, a pre-determined system wide output value, such as 0, may be used to indicate this mismatch. Subsequent processing may identify the output as a mismatch and may optionally discard that particular pattern recognizer's output.

In another embodiment, the input sources are already defined as text, image, signal or video and only relevant pattern recognizers will be applied to any input stream while others are turned off.

In step 240 the set of elements generated in step 230 are ran through relationship tests and identified relationships are extracted and added to the set of elements. Relationship test functions take the initial set of elements and extract mathematical relationships existing between the elements, such as equality, correlation, mapping via function, and magnitude comparison.

For example:

1) Inverse $(a_i, a_j)$ can produce $$\binom{n}{2}$$

identified relationship indications between 0 and 1, for all $(1 \leq i \leq n)$, $(1 \leq j \leq n)$, based on how correlated the deviation of $a_i$ and $a_j$ is in opposite directions on the number line.

2) Correlation$(a_i, a_j)$ can produce $$\binom{n}{2}$$

identified relationship indications between 0 and 1, for all $(1 \leq i \leq n)$, $(1 \leq j \leq n)$, based a statistical relationship involving dependence to indicate the level of correlation between $a_i$ and $a_j$.

3) Min$(a_i, a_j)$, Max$(a_i, a_j)$ can produce $$\binom{n}{2}$$

identified relationship indications between 0 and 1, for all $(1 \leq i \leq n)$, $(1 \leq j \leq n)$, based on whether $a_i$ is small when $a_j$ is large, or vice versa.

Thus, if we have a set of n elements run through k relationship tests each producing $$\binom{n}{2}$$

values, then $$k\binom{n}{2}$$

elements are added to the initial set of elements to yield a new set of elements which now has $$n + k\binom{n}{2}$$

values.

In step 250, the set of elements are applied against learned weights. Learned weights are values which can be adjusted to give certain heuristics more 'power' to influence results than others. In one embodiment, the default values of all of the weights are 1 but can be adjusted later in system learning. The output of this process results in a final set of elements which is the final cognitive fingerprint. For example, if a user of the system determines that two core cognitive fingerprints, which are within a certain threshold, do not actually indicate the same problem (e.g. theft of data), the user may provide such feedback to the system. This feedback, in turn, will cause weights for the pattern recognizers that caused the threshold convergence to be decremented.

In step 260, the final cognitive fingerprint can be stored in a fingerprint database and/or sent to a fuzzy comparator for further action. The fuzzy comparator makes an optimum decision by evaluating each data element in the final cognitive fingerprint. It can be appreciated that the final cognitive fingerprint can be plotted as a vector with a point in space. Fingerprints of various types of content can similarly be plotted in this space. When other similar pieces of content similar are encountered, a fingerprint comparison may yield insights into similarly and mutual relevance.

For each fingerprint calculated for content C1, C2, ..., Cm, the distance between these fingerprints can be calculated. The square of the distances can be summed and represented as a scalar value. When this distance exceeds a certain threshold there is no match. The match function itself provides a fuzzy notion of matching, i.e. a real number between 0 and 1, rather than a true or false Boolean value.

Two fingerprints can be compared by taking a sum of squared differences between each vector element and determining if the result falls below a threshold value. When the user or app provides system learning regarding the efficacy or usefulness of a fingerprint this feedback is captured. If the fingerprint is not useful, the heuristics which have the highest deltas between them can be strengthened by incrementing their corresponding weight multipliers in vector W. Over time, this minimizes the noise from heuristics that cause a fingerprint to be associated with inaccurate goal states.

In step 270, the fuzzy comparator sends final cognitive fingerprint to an action engine which launches an action if the fingerprint is within the threshold of a target goal. For example, if the fingerprint matches or approaches an espionage/data theft goal state then an action might trigger a system shut down and email an alert to the system administrator. Similarly, if the system indicates a fingerprint approaching a possible malware goal state then an action could be to quarantine the possible malware and email an alert to the system administrator.

Figure 4:
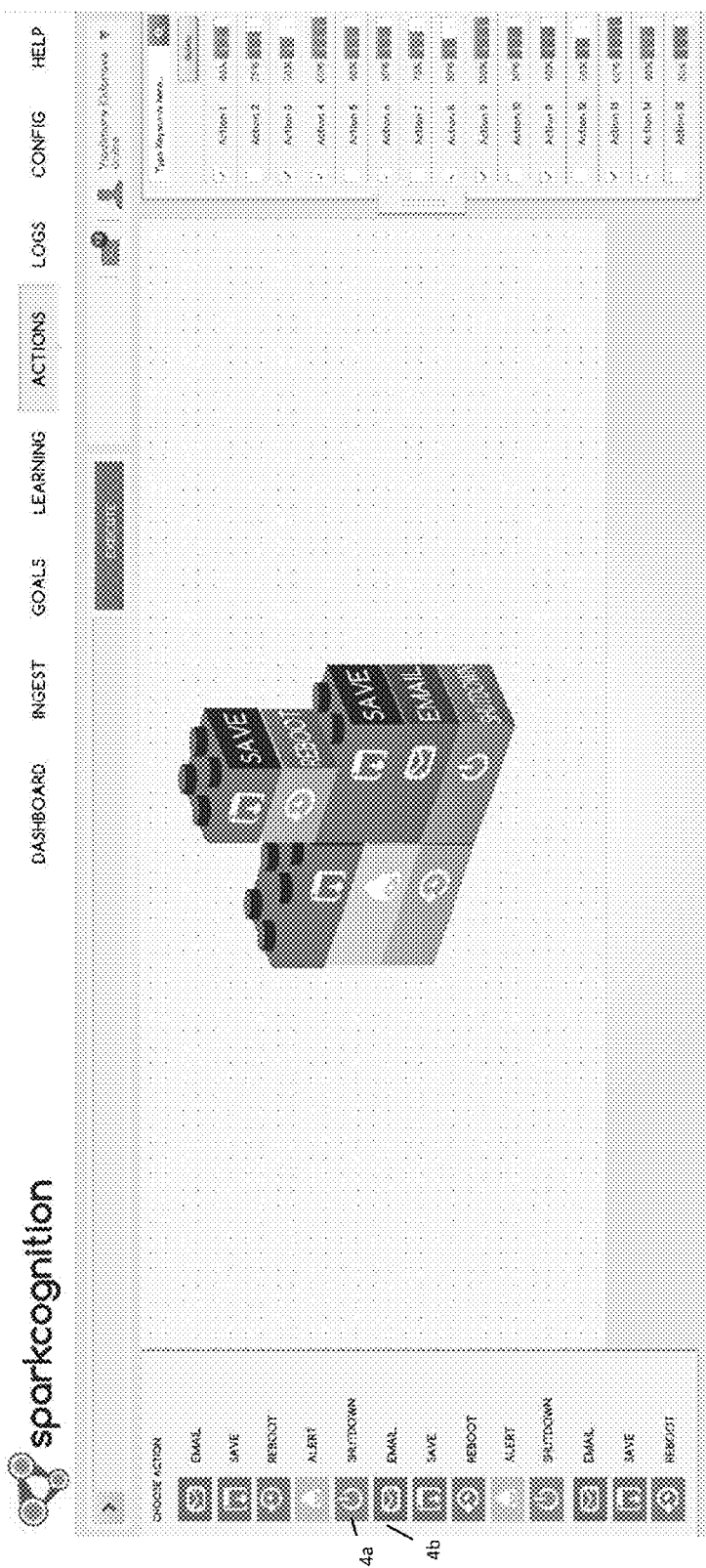
FIG. 4 is an actions screen of a cognitive fingerprint process according to an exemplary embodiment of the present invention.

FIG. 4 is an actions screen according to an exemplary embodiment of the present invention. A user can piece together custom responses if a fingerprint approaches or reaches a goal state. For example, if the system indicates a fingerprint approaching an espionage/data theft goal state then an action could be to trigger a system shutdown 4a and email 4b an alert to the system administrator. Similarly, if the system indicates a fingerprint approaching a possible malware goal state then an action could be to quarantine the possible malware and email an alert to the system administrator.

Figure 5:
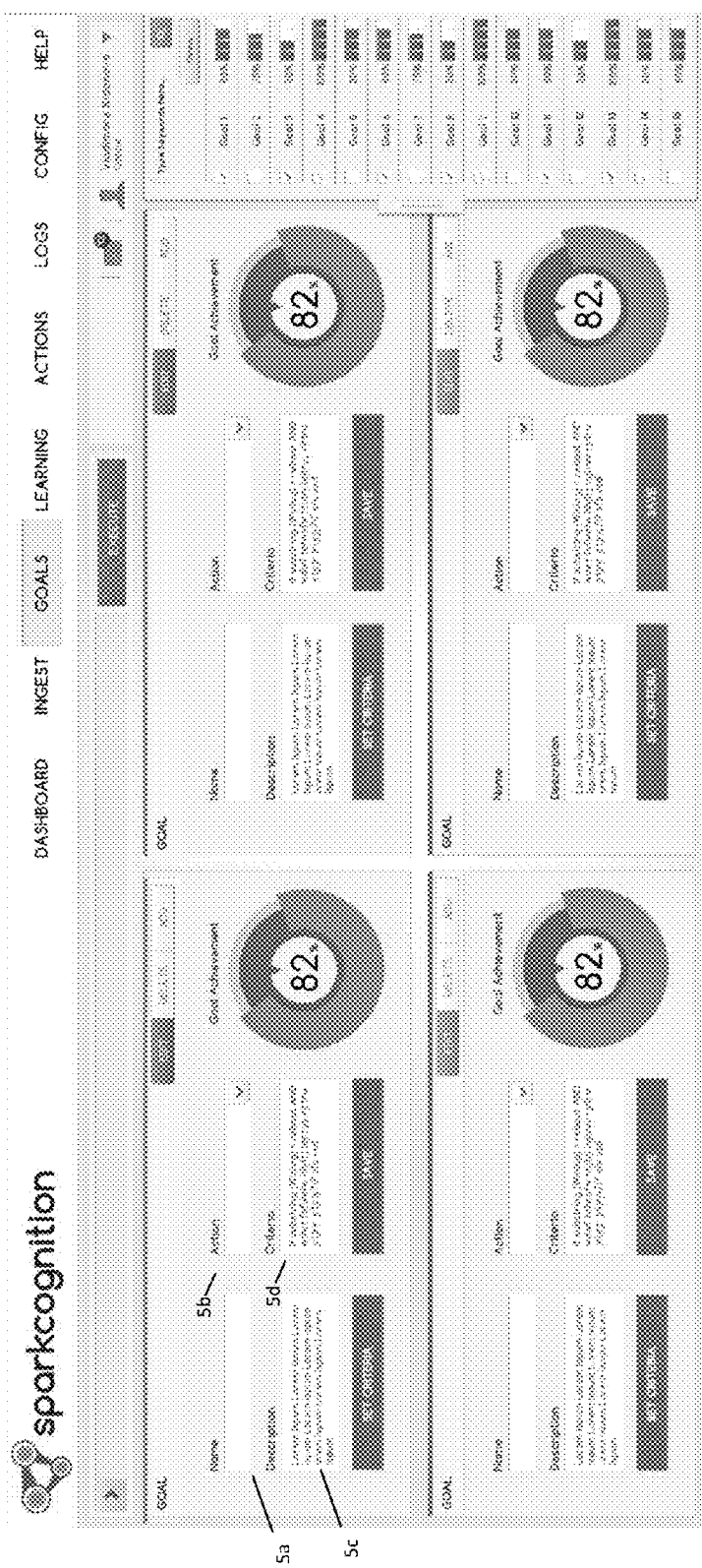
FIG. 5 is a goals screen of a cognitive fingerprint process according to an exemplary embodiment of the present invention.

In step 280, a user can reconfigure the goals or system learning. FIG. 5 is a goals screen of a cognitive fingerprint system according to an exemplary embodiment of the present invention. A user can edit, delete, or add goals by entering a goal name 5a, a goal action 5b, a goal description 5c, and criteria 5d that define system states the user is interested in identifying, predicting, and taking action on. Thus, a user can define what a goal is, and what it looks like when it is encountered. Example criteria could be the system crashing or a CPU workload percentage.

Figure 6:
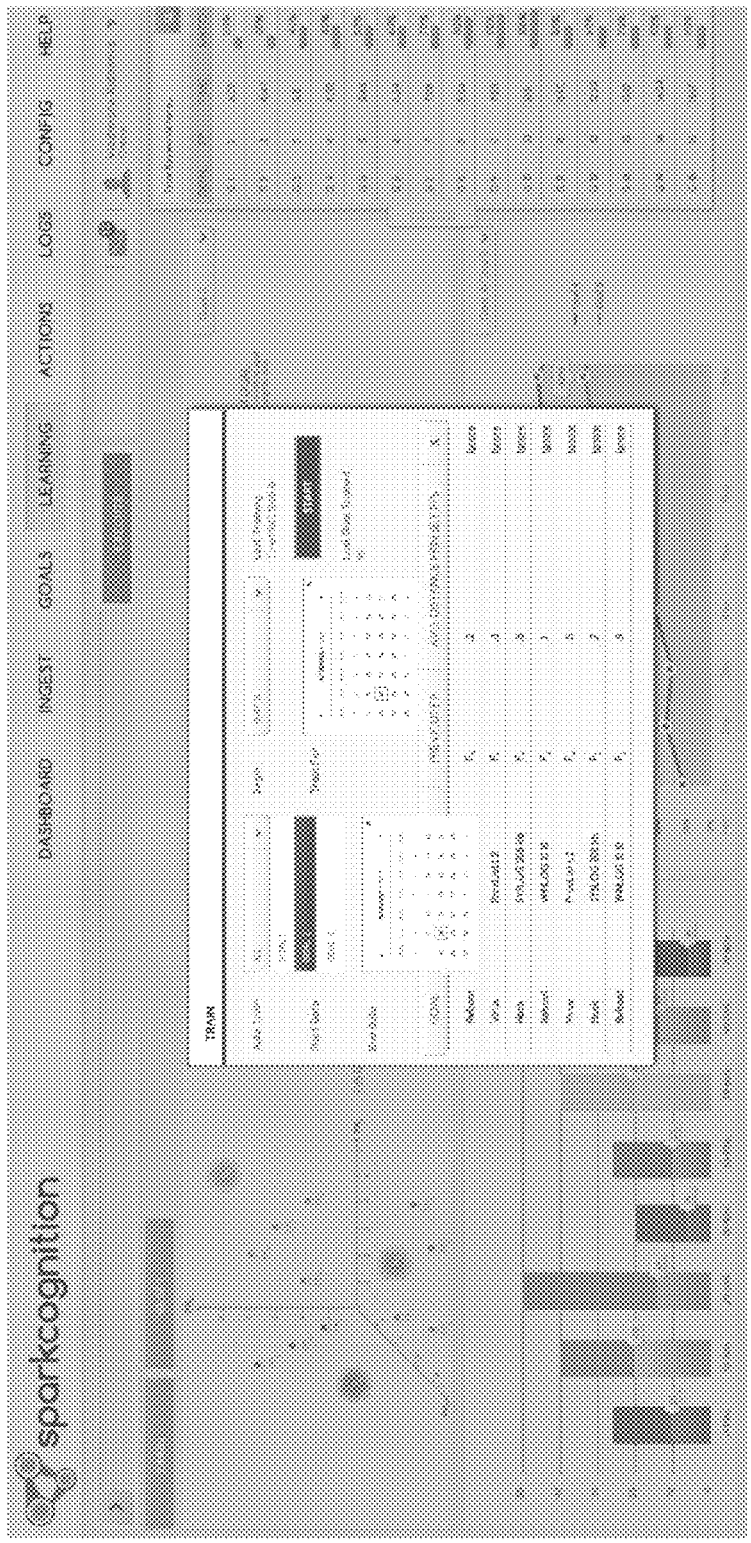
FIG. 6 is a learning screen of a cognitive fingerprint process according to an exemplary embodiment of the present invention.

FIG. 6 is a learning screen according to an exemplary embodiment of the present invention. A user can use past data for system training and can identify instances where previous fingerprints have approached a goal states, or can tell the system to ignore some of its previous learning. By associating various fingerprints with goal states, the system can predict whether a current fingerprint is approaching a target goal state and action needs to be taken. The learning screen also allows a user to visualize the various goals in space by displaying a graph with the various fingerprints associated with each goal. A user can also reconfigure weights W which will influence which Pattern Recognizers get more priority when constructing a fingerprint.

Figure 7:
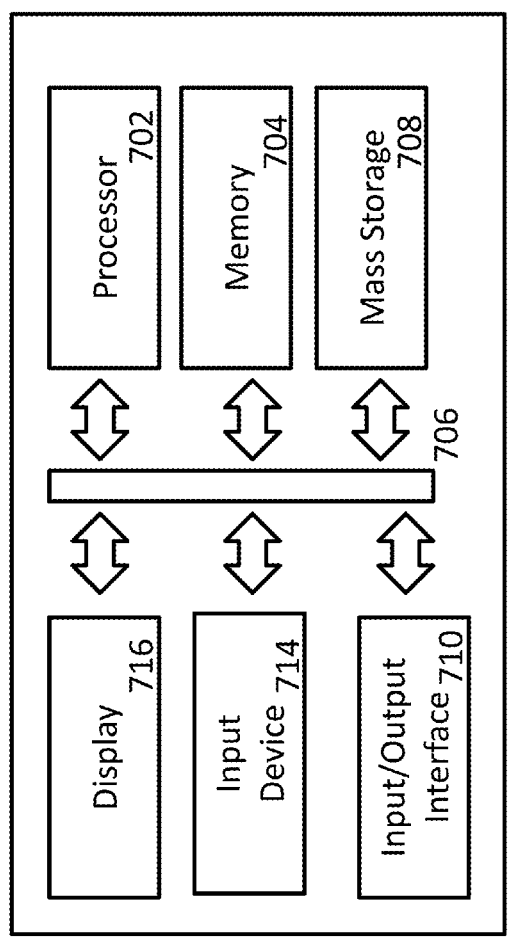
FIG. 7 is an exemplary system according to an embodiment of the present invention.

FIG. 7 depicts a functional block diagram of computer system. Computer system 702 includes a central processing unit (CPU) 702, a memory 704, an interconnect bus 706, and a display 716. The CPU 702 may include a single microprocessor or a plurality of microprocessors for configuring computer system 702 as a multi-processor system. The memory 704 illustratively includes a main memory and a read only memory. The computer 702 also includes the mass storage device 708 having, for example, various disk drives, tape drives, etc. The main memory 704 also includes dynamic random access memory (DRAM) and high-speed cache memory. In operation and use, the main memory 704 stores at least portions of instructions and data for execution by the CPU 702.

The mass storage 708 may include one or more magnetic disk or tape drives or optical disk drives, for storing data and instructions for use by the CPU 702. At least one component of the mass storage system 708, preferably in the form of a disk drive or tape drive, stores the database used for providing the decision assistance of system of the present invention. The mass storage system 708 may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

An exemplary embodiment of a fingerprinting platform workflow is for predicting motor failure. A motor going below 5,000 RPM can be defined as a disaster event which a user might want to predict.

A user can include input sources from the motor such as the motor speed, the motor head level, the motor oil level, and the usage data of the motor which can be streamed in real time.

A user can also include specifying a 4 hour sliding window of time so that only data from the last 4 hours will be extracted. These extraction criteria provide the parameters for the extracted data.

Pattern recognizers are provided which take the extracted data and analyze different patterns found in the data. PR1 outputs an average motor heat over the time period value, PR2 outputs an average oil level over the time period value, PR3 outputs a frequency of use value, and PR4 outputs a volatility of use value.

The processor runs extracted data through the 4 pattern recognizers to and PR1 outputs 0.4 corresponding to its average motor heat heuristic, the PR2 outputs 0.5 corresponding to its average oil level heuristic, PR3 outputs 0.9 corresponding to its frequency of use heuristic, and PR 4 outputs 0.2 corresponding to its volatility of use heuristic. Thus, the set of elements is [0.4, 0.5, 0.9, 0.2].

The set of elements is applied against a set of weights which only 0.5 for the first element and 1 for all of the other values. Thus, the motor heat heuristic is deemphasized. The final fingerprint is the set of elements [0.2, 0.5, 0.9 and 0.2] because only the first element was multiplied by 0.5.

This fingerprint can be sent to a fuzzy comparator. The fuzzy comparator has in its database 20 other 5,000 RPM disaster event fingerprints that have been previously identified, one for each time the event occurred. The fuzzy comparator compares the current fingerprint with the disaster set of fingerprints by calculating a distance in space. The fuzzy comparator might send the fingerprint to an action engine if the distance is within a predetermined threshold of a goal state. The action engine takes corrective action because the fingerprint falls within a threshold of the disaster goal state approximated by the 20 other fingerprints.

A user can go and reconfigure previous goals by associating or dissociating new fingerprints with the goals or create new goals for further learning. It can be appreciated that in a complex system like a factory floor, many things may lead to the motor going below 5,000 RPM. Each of the 20 fingerprints may actually correspond to different reasons for failure. If we create a cluster diagram of those 20, we may find that there are 3 groupings (using a statistical technique known as clustering). This would suggest that while there are 20 failures, there are really 3 reasons why. Thus, different actions can be created for the different groupings.

Other embodiments for the fingerprinting platform can be for detecting malware by creating cognitive fingerprints that identify and predict the presence of malware; detecting hacking by identifying and clustering fingerprints that immediately preceded a hack; and detecting phishing by creating cognitive fingerprints which correlate messages, their contents, links and payloads with what they actually do on the system.

Data theft can be detected by aggregating all data sources and logs into a single stream that is analyzed to create a cognitive fingerprint. This aggregation can be used to detect anomalies through past indexed fingerprints, thus providing a powerful filter to identify data theft attacks.

A cognitive fingerprinting system can also be used to identify and cluster fingerprints that immediately precede a hack. A current system state fingerprint can be compared to these previously identified clusters to predict the likelihood and propensity of a hack attempt.

A cognitive fingerprinting platform can be used to prevent a byzantine website type of attack. This is possible by accumulating a set of "blacklist" fingerprints without human intervention. Browsing trends consistent with problems and infections are flagged.

Cognitive fingerprints can be used to correlate messages by content, links, and payloads, and compare these messages to what they actually do on the system. Thus, phishing attempts can be detected when a fingerprint approaches a state for example where previous similar fingerprints have corresponded to flagged states.

A fingerprint can be used as "Temporal Security Signature" of an individual based on their past usage of a certain type of system for a particular purpose. Using a cognitive fingerprint in the manner does not prevent unauthorized access entirely, but does provide a means to detect if a user is who he claims to be. It can be appreciated that this technique can also be used to audit all inbound access and usage to detect user sessions that are "outliers", or those that do not appear to be consistent with the Temporal Security Signature for a particular individual. Temporal Security Signatures are expressed as vectors where each individual scalar value provides a measure of the end-user's interactions with the system over some period of time. These Temporal Security Signatures can be constructed by first collecting a set of interaction metrics. These interaction metrics can be measures such as:

1) Average typing speed
2) Frequency of words used
3) Frequency of letters used
4) CPU profile
5) Memory usage profile
6) Usage profile of services
7) Usage profile of processes
8) Resource usage profile by process
9) Storage used per session
10) Best-fit measure of storage usage over multiple sessions
11) Network usage per session
12) Security Events generated over time (from system log)
13) Application Events generated over time (from system log)
14) System Events generated over time (from system log)
15) Session Length
16) Number of commands issued per session
17) Number of times system-level access (sudo, or in Windows, Administrator Rights) was used per session Each of these metrics is measured and captured either as: a scalar value (SV), for example, in the case of average typing speed (e.g. 78 wpm); a set of coefficients (SC) and formula for a best-fit curve, in the case of CPU profile (e.g. a=2, c=4, function=ax+c); or a vector of quantized values (QV), such as in the case of Storage used per session (e.g. [10 MB, 2 MB, 8 MB, 12 MB] indicating storage used over the last 4 sessions). Each measured metric is stored as a three-tuple indicating the type of value, the metric identifier and the actual datastructure containing the value. For example:

{SV, "Avg. Typing Speed", 78}
{SC, "CPU Profile", "2, 4, ax+c"}
{QV, "Storage Per Session", [10,2,8,12]}

Each such 3-tuple is then added to a vector, S, as its constituent values. For the three 3-tuples above, the vector S becomes:

S=({SV, "Avg. Typing Speed", 78}, {SC, "CPU Profile", "2, 4, ax+c"}, {QV, "Storage Per Session", [10,2,8, 12]})

It can be appreciated that the type of value can be inferred in some implementations, and thus the storage of the type identifier (e.g. SV, QV, SC) may be unnecessary. This is especially true in programming languages that support type querying. In this case, the 3-tuple can be reduced to a name value pair, or 2-tuple.

This vector S is the Temporal Security Signature for a particular user, over a series of sessions (hence, Temporal) on a particular system. The method may store S in a database, associated with the name of the system on which this signature was generated, along with the name of the user and role for whom the signature was generated. With every subsequent user session, this vector is updated with the latest values.

Now that the Temporal Security Signature, S, is available, it can be used to audit sessions currently in progress, or those found in a historical log. In order to compare S with the current session, a Temporal Security Signature S' is constructed which is limited to metrics collected over the current session. In other words, it does not include historical data.

Each element of the vector, S' is compared to the corresponding element in the vector S. There are defined functions which compute the difference between corresponding elements in S and S' based on their type. For example, a function may exist, called deltaSV(a,b) which computes the difference between a and b, given that both a and b are scalar values. It is possible that this function simply substracts the value of b from a, or vice versa. Or an entirely different method might be used, such as the square of the difference. The specifics of how differences are calculated can be implementation dependent, but suffice to say that at the very basic level, subtraction is a viable delta/difference calculation technique for SV types. A sum of distances-squared approach is a viable means of difference calculation for SC types. And difference in mean values is a viable means of difference calculation for QC types.

Once all individual distances are calculated, they can be collapsed into a single measure of difference by techniques such as:

Addition of all differences
Weighted addition of all differences (each difference is multiplied by a weight, and then added to the others to produce a weighted sum)
Addition of a subset of differences
The greatest difference (max of all differences)
The least difference (min of all differences)

If the difference between a S and S' exceeds a user-defined value, it is deemed to be an anomalous reading indicating that the session should be investigated as it may possibly be unauthorized.

Note also that S' may not necessarily be the current session vector. In the case of historical logs, it may be produced by analyzing the metrics for a single historical session. Comparisons of historical sessions with the Temporal Security Signature could generate an audit trail of suspicious logins that occurred in the past.

In order to reduce false positives in a system of this nature, attention must be given to the means by which delta or difference calculations are done. For example, when comparing storage usage in the current session vs. historical usage, it may be necessary to compare current usage with the weighted average of historical usage so as to minimize the impact of outlier sessions that occurred a small number of times, but resulted in a large amount of data consumption. In real-world terms, there may be one initial session during which the user installed all software on the system. This would be a session that resulted in the consumption of gigabytes of data. Subsequent to this session, the user may never have consumed more than 50 MB in a single session. Given that the initial session occurred only once, over say 100 sessions, the amount of usage may be multiplied with a weight of 10% and then averaged with the other numbers. If there are two or three sessions each of which resulted in multiple-gigabytes of usage, a weight of 20 or 30% might be assigned to these large values. In the event that a reading is occurring more than 5 or 10% of the time, a weight of 100% might be assigned.

An application of the Cognitive Fingerprinting methodology is to derive business insight data from Cognitive Fingerprints gathered over a large number of systems. For example, a large number of devices, which could be personal computers, laptops, phones, tablets etc. are equipped with the means to create cognitive fingerprints based on the information captured in their performance and security logs. This could include Cognitive Fingerprints indicating failure states (i.e. a device being frozen, or rebooting) or security compromise states (i.e. a remote login from an unknown location, running an unrecognized process not installed by the user etc.). These Cognitive Fingerprints are gathered from all endpoint devices to a central service, or server. Here they are stored and cataloged. Analysis of these cognitive fingerprints by type of device, by manufacturer of device, by application types/loads on device and other such criteria can then yield substantial business insight. For example, laptops by manufacturer A are twice as likely to reboot unexpectedly as compared to manufacturer B. Running a CAD (Computer Aided Design) application on systems by manufacturer A is more stable and faster than running the same application on systems built by manufacturer B.

Cognitive Fingerprints can be used as a means to auto-generate live malware signatures. Based on the behavioral analysis of a computer system—for example, the resource usage—or by comparing the running process list, files present and system configuration of the computer system, it is possible to define "bad" states a system should avoid. Whenever a system enters this bad state, the Cognitive Fingerprint associated with some preceeding length of time N can be tagged as a potential malware signature. This signature can be stored in a database, via an online server or service, and distributed out to other systems capable of reading and processing Cognitive Fingerprints. When their current Cognitive Fingerprint approaches any of these suspected malware Fingerprints, warnings can be generated for the user, or actions can be invoked.

The heuristics and other constituent functions used to generate a Cognitive Fingerprint can be rendered visually via a graph, creating a visual signature. For example, in one manifestation, each heuristic can be added to a bar graph as a bin on the X axis, with the output of the heuristic plotted on Y. A chord diagram is another way to visually render Cognitive Fingerprints, with half of the chord showing the names of heuristics and the other half showing values between 0 and 1. Each heuristic connects via a curve, to its corresponding numeric output.

Figure 8:
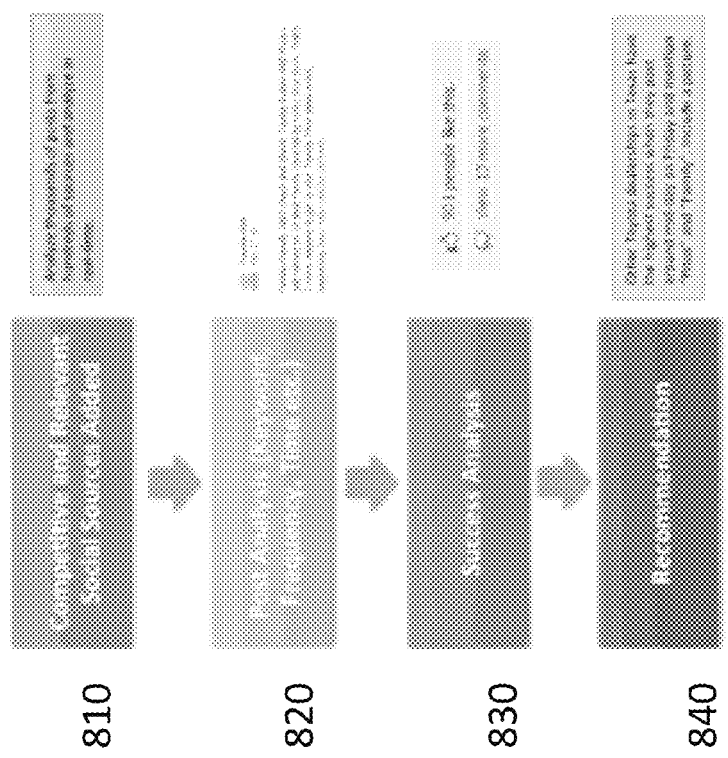
FIG. 8 is a process for engaging and providing recommendations through social media.

Another embodiment of the cognitive fingerprinting platform is for engaging with people through social media and other online services. FIG. 8 provides a process for engaging through social media. In step 810, competitive and relevant social sources are added. Sources can be from social network posts, messages, and other distributed content. Once the relevant social sources are added, in step 820 posts from social media sources are tagged by factors such as keywords, frequency, and time in preparation for further analysis. After the posts have been tagged, in step 830 the posts are analyzed for success factors such as likes and comments. Finally in step 840, recommendations are made for a post to have the most impact on a particular topic. For example, recommendations can include the best time and keywords a post should have to achieve a specific objective. Recommendations can also include other elements of a post such as color, positioning, and images. An example recommendation could be that if you are trying to sell a car on Facebook, make sure to mention to include the keywords "family" and "safe" and post on a Friday between 5 and 8 pm, and ensuring that the image you are posting has blue and green as the dominant colors.

A method to forecast time series is also provided. There many statistical techniques used to forecast Time Series (TS) such as ARMA, ARIMA and Holt-Winters and neural networks. In one novel embodiment, time series predictions are made based on an Optimal Length Pattern Frequency Lookup Technique. This approach provides a better mix of attributes in terms of being representative of the original signal, having a high speed of operation due to simple transforms and operations and exhibiting rapid learning with support for user-defined caps on time spent on learning from patterns. Given TS, a time series of length n, such that TS has no missing values (all times are represented by values) the following algorithm is part of this approach:

```
Create a set (of unique elements) from the given, length n Time Series, TS
Let this set be called U where k is the length of the set U (k <= n)
Let the nth element of TS be addressed as TS[n]
Let a sequence made up of elements from 1 to n in TS be addressed as
TS[1:n]
For i = 1 to n:
    seq_done = 1
    For j = seq_done to n:
        Let NextVal be the value that occurs after TS[seq_done:j] in TS
        Add key/value entry in datastructure Freqs with key =
        TS[seq_done:j] and value = NextVal
    Next j
    Increment seq_done
Next i
```

Once this algorithm executes, a data structure called Freqs will be populated with key value pairs such that all possible consecutive sequences of values occurring in the Time Series would be associated with the value that comes right after the sequence. For example:
TS=[0,3,4,5,4,3,2,1,2,3,4,5,6]
Freqs=[{0,3},{03,4},{034,5},{0345,4},{03454,3} . . .
{3,4},{34,5},{345,4} . . .
{45,6]

After the Freqs structure has been created it is used to make predictions. For example, assume the method is given TS'=[3,4,5,4,3] and asked to predict the next value. The time series [3,4,5,4,3] has 5 elements and the method needs to predict the 6th element. Here is how the method proceeds. First, construct all possible sequences ending with the last value in TS', as follows:
3
43
443
4543
34543

Next, starting with the longest sequence, the method finds any occurrence of these sequences in the Freqs table:
34543 occurs once and the associated successive value is 2
4543 occurs once and the associated successive value is 2
543 occurs once and the associated successive value is 2
43 occurs once and the associated successive value is 2
3 occurs thrice and the associated successive values are 2, 4, and 4

Next, the method discards all subset sequences of the largest sequence that have the same successive values. The list now becomes:

34543 occurs once and the associated successive value is 2
3 occurs thrice and the non-eliminated associated successive values are 4 and 4

The method repeats the discard process for all remaining sequences with length>1. The method discards all subset sequences which have the same successive values as the larger sequence. Here the method is still left with the same list:

34543 occurs once and the associated successive value is 2
3 occurs thrice and the non-eliminated associated successive values are 4 and 4

Next, the method calculates the likely successive value by taking the length of all sequences and replicating the successive values a number of times equal to their length. For example, in this case, the method gets:

Length of 34543=5. Replicate 2, 5 times.
Length of 3 is one. Replicate 4 once
Length of 3 is one. Replicate 4, once The method ends up with:
5
5
5
5
5
4
4

Next, the method computes the average of these numbers, in this case 32/7=4.57. This is the value the method will predict as the next in the sequence described by TS'.

In one embodiment, if no fractional numbers are found in the training Time Series (TS) and the predicted Time Series (TS') and the method get a fraction as an answer, then it is rounded up. So in this case, 4.57 will become 5, since TS and TS' do not contain fractional (non-whole) numbers.

To account for the pattern and frequency of transition magnitudes, the method further computes all TS[x+1]−TS[x] and store these distances in a vector, D. Next, the method counts occurrences of each distance in D and create a dictionary/name-value pair store which appears as follows, based on this example TS above:
TS={0,3,4,5,6,3,2,1,2,3,4,5,6}
D={3,1,1,−1,−1,−1,−1,1,1,1,1,1}
DDict=[{1:7}, {−1:4},{3:1}]

Next, the method takes the proposed prediction (in this example it is 5), and computes the difference between the prediction and the last value in the TS' Time Series. In this example, this number is 2. Next, the method calculates the difference between 2 and each one of the numeric "names". This yields:
Diff(2,1)=1
Diff(2,−1)=3
Diff(2,3)=1

Next, the corresponding frequency values are associated with each of these differences, from the DDict structure. This yields:
7/1=7
4/3=1.33
1/1=1

Next, the method is seeking the transition magnitude that is closest to the one projected by its own prediction, while also looking for the highest likelihood transition magnitude (most frequent). In other words, the method is trying to minimize the value to the left, and maximize the value to the right of the semicolon above. The fraction RHS/LHS that yields that highest value would be maximizing the RHS while minimizing the LHS. For example:
7/1=7
4/3=1.33
1/1=1

The magnitude 1 transition wins by a big margin, here. Next, the method is caught between deciding whether to go with the original prediction of 5, which is a magnitude 2 delta from the last known value in TS', or going with a prediction of 4, as dictated by the calculations above. In this case, the method can make the decision in two ways. In the first way, it can simply use a 50/50 probability to pick one prediction. In the second way, it can look at past data and determine how accurate either one of these approaches would have been for historic predictions over known data (backtesting). The resulting accuracies for both can yield weights for each. For example, if the error for the first approach is 30% (or 70% correct), and the error for the second is 22% (i.e. 78% correct), then the method can use the answer proposed by the first approach with probability 70/(70+78) and the answer proposed by approach two, with probability 78/(70+78). Alternatively, the method can use both, weighing the average by the factors indicated previously.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

The systems and methods of the present disclosure may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

The invention claimed is:

1. A computer implemented method of constructing a cognitive fingerprint, comprising:
    identifying a set of time frames, each time frame corresponding to a respective data source, within which data is extracted from the data source by a computer system;
    providing a plurality of pattern recognizers each having an assigned heuristic;
    processing, by the computer system, a combined stream of extracted data through the plurality of pattern recognizers to generate an initial set of elements, each element corresponding to the output of the heuristic assigned to each pattern recognizer;
    extracting identified relationships amongst the initial set of elements;
    modifying the initial set of elements to include the identified relationships to create an intermediate set of elements;
    comparing, by the computer system, the intermediate set of elements against assigned weight values to emphasize or deemphasize each element in the intermediate set of elements to create a final set of elements, wherein the final set of elements forms a cognitive fingerprint representing a signature of the data extracted from the time frame;
    comparing, by the computer system, the cognitive fingerprint to a previously recorded cognitive fingerprint by taking a sum of squared differences between each element in the final set of elements and each element of the previously recorded cognitive fingerprint to determine a scalar value;
    comparing, by the computer system, the scalar value to a threshold of a target goal; and
    one or more of shutting down the computer system or quarantining at least a portion of the extracted data in response to the scalar value being within the threshold of the target goal.

2. The computer implemented method of claim 1, wherein the identified relationships include equality, correlation, mapping via function, and magnitude comparison.

3. The computer implemented method of claim 1, wherein the assigned weight values are adjusted by system learning.

4. The computer implemented method of claim 1, wherein each heuristic is specified to content type.

5. The computer implemented method of claim 1, further comprising using the cognitive fingerprint to correlate messages by content, links, and payloads.

6. The computer implemented method of claim 1, further comprising using the cognitive fingerprint as a temporal security signature of an individual based on their past usage of the system.

7. The computer implemented method of claim 1, further comprising sending an email alert to the system administrator in response to the scalar value being within the threshold of the target goal.

8. A computer system comprising:
   a hardware processors;
      a memory communicatively coupled to the hardware processors and having stored thereon a program of instructions, the instructions configured to, when read and executed by the hardware processors:
         identify a set of time frames, each time frame corresponding to a respective data source, within which data is extracted from the data source;
         provide a plurality of pattern recognizers each having an assigned heuristic;
         process a combined stream of extracted data through the plurality of pattern recognizers to generate an initial set of elements, each element corresponding to the output of the heuristic assigned to each pattern recognizer;
         extract identified relationships amongst the initial set of elements;
         modify the initial set of elements to include the identified relationships to create an intermediate set of elements;
         compare the intermediate set of elements against assigned weight values to emphasize or deemphasize each element in the intermediate set of elements to create a final set of elements, wherein the final set of elements forms a cognitive fingerprint representing a signature of the data extracted from the time frame;
         compare the cognitive fingerprint to a previously recorded cognitive fingerprint by taking a sum of squared differences between each element in the final set of elements and each element of the previously recorded cognitive fingerprint to determine a scalar value;
         compare, by the computer system, the scalar value to a threshold of a target goal; and
         one or more of shut down the computer system or quarantine at least a portion of the extracted data in response to the scalar value being within the threshold of the target goal.

9. The computer system of claim 8, wherein the identified relationships include equality, correlation, mapping via function, and magnitude comparison.

10. The computer system of claim 8, wherein the assigned weight values are adjusted by system learning.

11. The computer system of claim 8, wherein each heuristic is specified to content type.

12. The computer system of claim 8, further comprising using the cognitive fingerprint to correlate messages by content, links, and payloads.

13. The computer system of claim 8, further comprising using the cognitive fingerprint as a temporal security signature of an individual based on their past usage of the system.

14. The computer system of claim 8, the instructions configured to, when read and executed by the hardware processors, send an email alert to the system administrator in response to the scalar value being within the threshold of the target goal.

* * * * *